(12) United States Patent
Färber (10) Patent No.: US 6,457,771 B2
(45) Date of Patent: *Oct. 1, 2002

(54) MOTOR VEHICLE ROOF

(75) Inventor: Manfred Färber, Wielenbach (DE)

(73) Assignee: Webasto Karosseriesysteme GmbH, Stockdorf (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/368,905

(22) Filed: Aug. 6, 1999

(30) Foreign Application Priority Data

Aug. 6, 1998 (DE) .......................... 198 35 535

(51) Int. Cl.⁷ ............................................. B60J 7/047
(52) U.S. Cl. ................................................. 296/220.01
(58) Field of Search .................................. 296/220.01

(56) References Cited

U.S. PATENT DOCUMENTS 5,335,961 A * 8/1994 Reinsch et al. ............. 296/213
5,484,185 A * 1/1996 Salz et al. ............. 296/220.01
5,897,160 A 4/1999 Reihl et al. ............. 296/220.01

FOREIGN PATENT DOCUMENTS

| DE | 43 29 583 C1 | 10/1994 |
| DE | 195 29 522 C1 | 8/1996 |
| DE | 195 29 702 C1 | 9/1996 |

* cited by examiner

Primary Examiner—Dennis H. Pedder
(74) Attorney, Agent, or Firm—Nixon Peabody LLP; David S. Safran (57) ABSTRACT

The invention relates to a motor vehicle roof with a series of cover elements (louvers 10a–d) for selectively closing and at least partially exposing a roof opening (13) in a fixed roof surface (11), the cover elements bordering one another in the closed position to form a flat panel system, each louver on its narrow end being connected to a pivoting fastening element (20a–d) which is guided along a roof-mounted guideway (75). The flat panel system is pushed together by pushing on the front and/or the back end to form a bundle of swung-out cover elements and it can also be moved as a bundle. At least some of all fully swung-out fastening elements (20a–d) are securely engaged to a common coupling element which can move along the roof-mounted guideway or can be fixed relative to it.

12 Claims, 11 Drawing Sheets

MOTOR VEHICLE ROOF

BACKGROUND OF THE INVENTION

1. Field of the Invention

The invention relates to a motor vehicle roof for selectively closing or at least partially exposing a roof opening in a fixed roof surface which has cover elements which border one another in a closed position to form a flat panel system, each louver being connected on a narrow edge thereof to a pivotable fastening element which is guided along a roof-mounted guideway for movement between a position in which the respective cover element is in the closed position and a position in which the respective cover element is filly swung out, two adjacent fastening elements being coupled for common motion in opening and closing directions until a first of the two fastening elements has reached the position in which the respective cover element is fully swung out, at which point the two adjacent fastening elements are decoupled enabling relative displacement of the second of the two adjacent fastening elements against the first as the second moves into the position in which the respective cover element connected thereto is filly swung out, and under the influence of motion of the second of the two adjacent fastening elements in the opening direction, the first fastening element is locked with a fastening element of a cover element already in the fully swung out position thereof, the locking being automatically released under the influence of motion of the second of the two adjacent fastening elements in the closing direction.

2. Description of Related Art

A generic motor vehicle roof of the type to which the invention is directed is known from German Patent Nos. DE 195 29 522 C1 and DE 195 29 702 C1. They describe a locking mechanism with a swivelling bolt block which securely interlocks adjacent fastening elements to one another under the direct influence of the opening motion of the fastening element which precedes these two fastening elements, i.e., without using a bolt block slide, as soon as these two fastening elements are swung fully out, or which unlocks them again under the influence of the corresponding closing motion. The disadvantage in this locking mechanism is that, in case of an accident, all the acceleration of the louver bundle must be accommodated by the locking between the last two fastening elements; this leads to failure of locking.

U.S. Pat. No. 5,897,160 discloses a similar motor vehicle roof in which the swung-out attachment elements are not locked among one another, but are each locked individually securely to the roof-mounted guideway. The locking elements are formed by bolt rockers which are pivotally supported in their middle section, and have on a bolt part on one end section and an actuating arm on their other end section. The bolt part fits into corresponding recesses in the roof-mounted guideway in the locking position.

The disadvantage is that, in this motor vehicle roof, the roof opening can only be opened from front to back, i.e., for example, the back part of the roof opening cannot be opened independently of the front part.

SUMMARY OF THE INVENTION

The primary object of this invention is to devise a motor vehicle roof with a series of cover elements, which has an automatically releasable locking mechanism which enables flexible opening and closing of the motor vehicle roof and also guarantees reliable locking in case of an accident.

This object is achieved as claimed in the invention proceeding from a motor vehicle roof of the initially mentioned type by at least some of all fully swivelled-out fastening elements being securely engaged to a common coupling element which can move along the roof-mounted guideway and which can be fixed relative to it.

In this approach of the invention, it is advantageous that the roof opening can be opened from the front and from the rear, and the locking mechanism of each individual fastening element is subjected only to a relatively small inertial force even in an accident.

In one advantageous embodiment of the invention, it is provided that the coupling element can be locked in at least one position to a roof-mounted guideway, preferably there furthermore being a coupling control part which can be driven along the guideway by a drive and which can be locked to the coupling element. This leads to safety in accidents.

In one advantageous development of the invention, the coupling element has a locking device for locking to the roof-mounted guideway or to the coupling control part, which is actuated by displacement of the coupling control part with respect to the coupling element in the closed position of the cover element combination, such that it releases the locking to the roof-mounted guideway and closes the locking to the coupling control part. When opening from front to back, this allows reliable fixing of the cover element bundle in the rear part of the roof opening, while opening is also possible from back to front selectively without additional driver interventions.

Preferably, the coupling control part is engaged to the rearmost fastening element such that displacement of the coupling control part along the roof-mounted guideway causes the rearmost fastening element to swing out or swing back. This makes actuation of the rearmost fastening element by a drive located forward unnecessary, so that a force transfer means from the front end of the roof opening to its back end is not needed.

It is also preferred that the coupling element furthermore comprises several members which are joined to one another with a pivoting capacity. This allows matching of the coupling element to arched roof shapes.

It is possible for the locking between the fastening elements and the coupling element to take place via a locking element which is made as a bolt rocker which is mounted to pivot in its middle section. On one end section, the locking element has a bolt part and on its other end section it has an actuating arm, the coupling element for each fastening element having a bolt recess for holding the bolt part. This represents a simple, and at the same time, reliable embodiment.

These and further objects, features and advantages of the present invention will become apparent from the following description when taken in connection with the accompanying drawings which, for purposes of illustration only, show a single embodiment in accordance with the present invention.

DETAILED DESCRIPTION OF THE INVENTION

In the following description, the terms "front," "forward" or "preceding" mean in a direction away from the louver that is fully swung out first, "back," "rear," "rearward," and "following" mean in the direction towards the louver that is fully swung out first, "inner" means transversely relative to the direction of travel of the louvers and towards the longitudinal centerline of the roof opening, "outer" means transversely relative to the direction of travel of the louvers and away from the longitudinal centerline of the roof opening, "top" and "upward" mean away from the floor of the motor vehicle, "bottom" and "downward" mean towards the floor of the motor vehicle. In regard to the illustrated embodiment, especially, "front," "forward" or "preceding" mean in the normal direction of forward vehicle travel, and "back," "rear," "rearward," and "following" mean opposite the normal direction of forward vehicle travel.

The term "louver" should not be understood restrictively with respect to geometrical shape, especially with respect to the ratio of length to width. It is also intended to encompass roof elements which are, for example, as long as they are wide.

Figure 1:
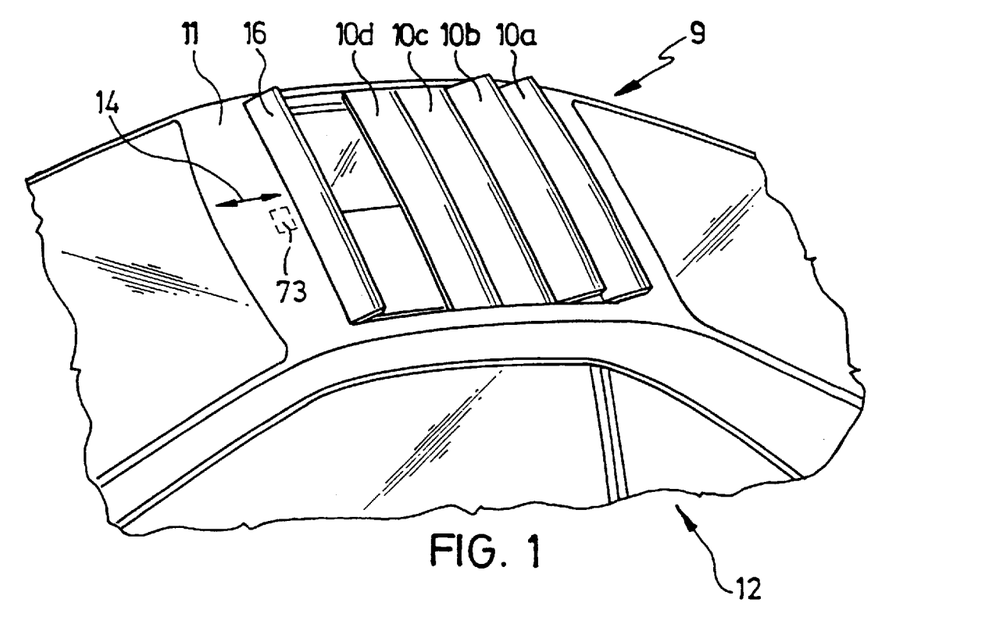
FIG. 1 is a schematic perspective view of a louvered roof in the partially opened state.
Figure 2:
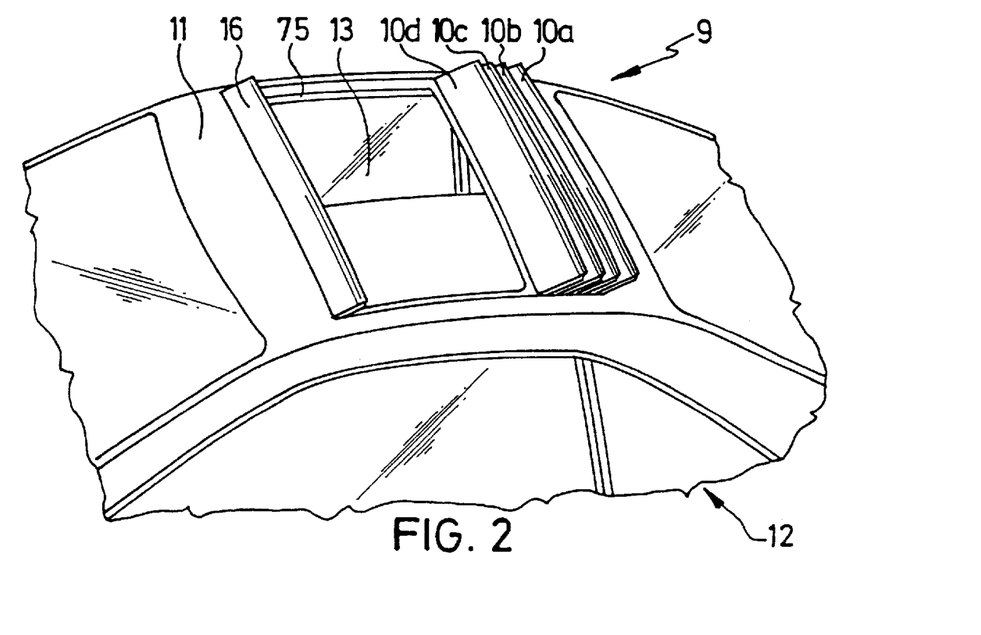
FIG. 2 is a view corresponding to FIG. 1 for a roof opening completely opened from the front.

The motor vehicle roof 9 which is explained here and which can be called a louvered roof has, as follows from the schematics of FIGS. 1 & 2, a series of sliding louvers 10a to 10d. These louvers are used for selective closing or at least partial exposing of a roof opening 13 which is made in a fixed roof surface 11 of a motor vehicle 12. To open and close the roof 9, the louvers 10a to 10d can be displaced; in the embodiment shown, the displacement direction indicated with the double arrow 14 running parallel to the longitudinal axis of the motor vehicle. Basically, other displacement directions are also possible, for example, transversely to the longitudinal axis of the motor vehicle. In their closed position, the louvers 10a to 10d abut one another with their longitudinal edges which run transversely to the displacement direction 14 (or with the sealing elements located there) there to form a seal. In doing so, they form a flat panel system of louvers as is shown in FIG. 1 for the two louvers 10d and 10c. The louvers 10a to 10d can, furthermore, each be pivoted around a (virtual) pivot axis which extends transversely to the direction of displacement 14 and which, in the embodiment shown, lies roughly at the height of the fixed roof surface 11.

An displacement mechanism, which is explained in greater detail below, coordinates the sliding displacement and pivot motions of the individual louvers 10a to 10d such that, when the sliding louvers are displaced, the flat louver system executes translational motion in the displacement direction 14 and this system is dissolved one louver at a time as each louver moves out of the system when the roof 9 is opened in the area of the front and/or back end of the system, or and is re-established when the roof is closed. In addition to opening from the front and/or the back, the louver bundle in the opened state can also be moved with a variable bundle size to anywhere on the roof opening. In the course of opening of the roof 9 which had been closed before, first the louver 10a is pivoted such that its back edge disengages from the back edge of the roof opening 13 into an oblique position. Then, an adjustment force can be exerted on the louver system toward the rear and/or toward the front.

For example, the louver 10a beginning in the above described oblique position can be pushed to the back together with the other louvers 10a to 10d which remain in the flat panel system, i.e., not swung out. During this translational movement, the louver 10a is continuously pivoted upward as it moves into its rearward end position. After the louver 10a has reached its rearward end position, which is illustrated in FIGS. 1 & 2, the next louver 10b is raised. This play is repeated until, as shown in FIG. 2, all of the sliding louvers 10a to 10c have been raised and pushed back to into their open position. When the roof 9 is closed, in this case proceeding from the open position according to FIG. 2, first only the louver 10d is moved forward and swung back into a position parallel to the fixed roof surface 11. A corresponding motion sequence is induced in succession for the following louvers 10c, 10b, and 10a until the louvers re-form the flat panel system in their front end positions closing the roof opening 13.

Figure 3:
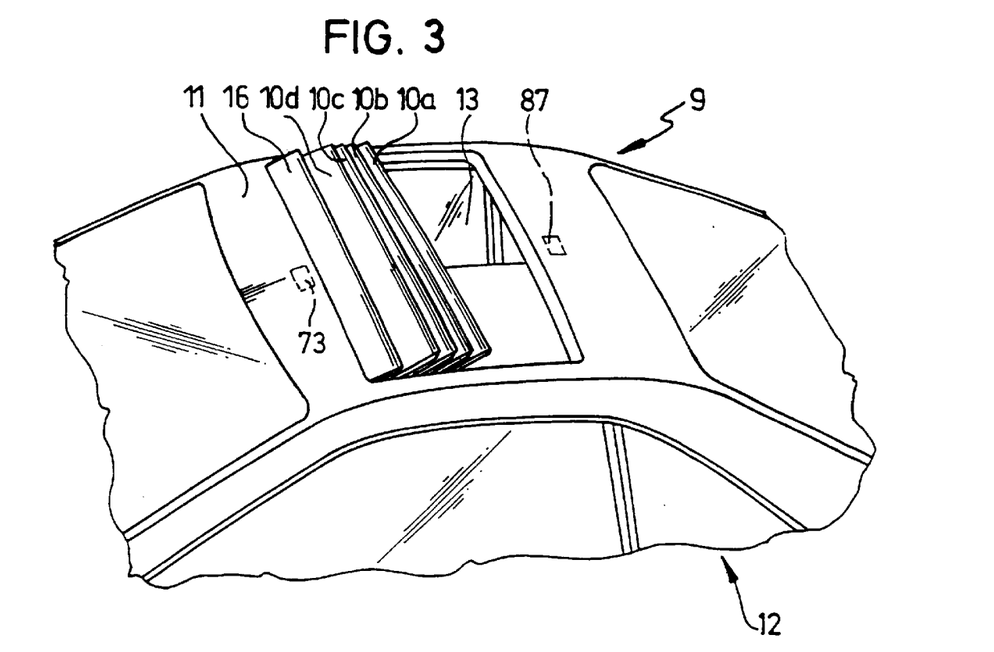
FIG. 3 is a view corresponding to FIG. 1 for a roof opening completely opened from the back.

However, it is also possible, after initial swinging out of the louver 10a, to exert an displacement force on the louver system from the back, and thus, to raise the louvers in succession beginning with the louver 10a and to push them together in the direction toward the front edge of the roof opening 13, as shown in FIG. 3.

Figure 4:
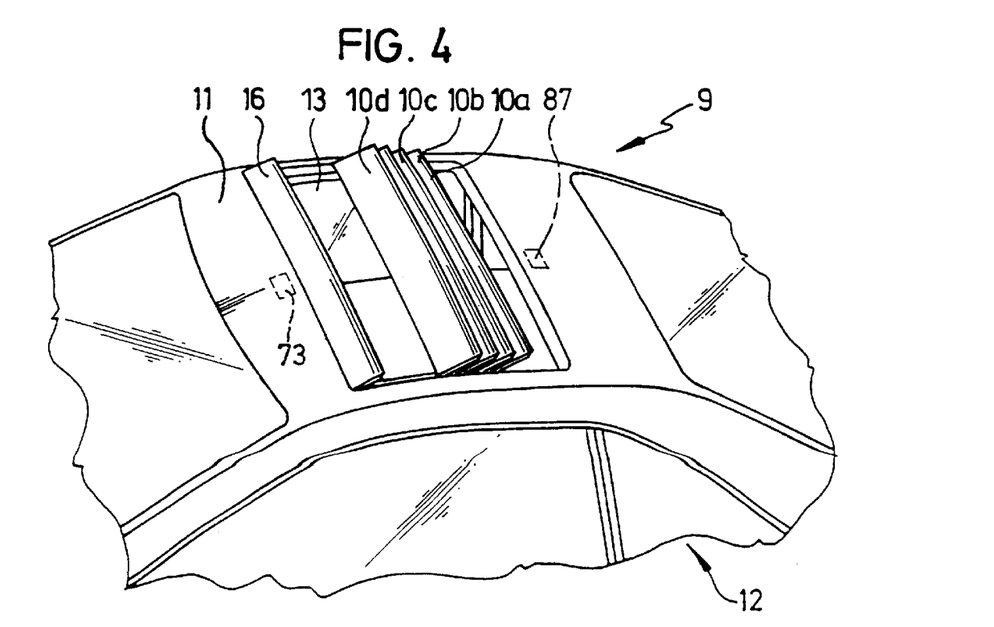
FIG. 4 is a view corresponding to FIG. 1 for a roof opening completely opened both from the front and the back.
Figure 5:
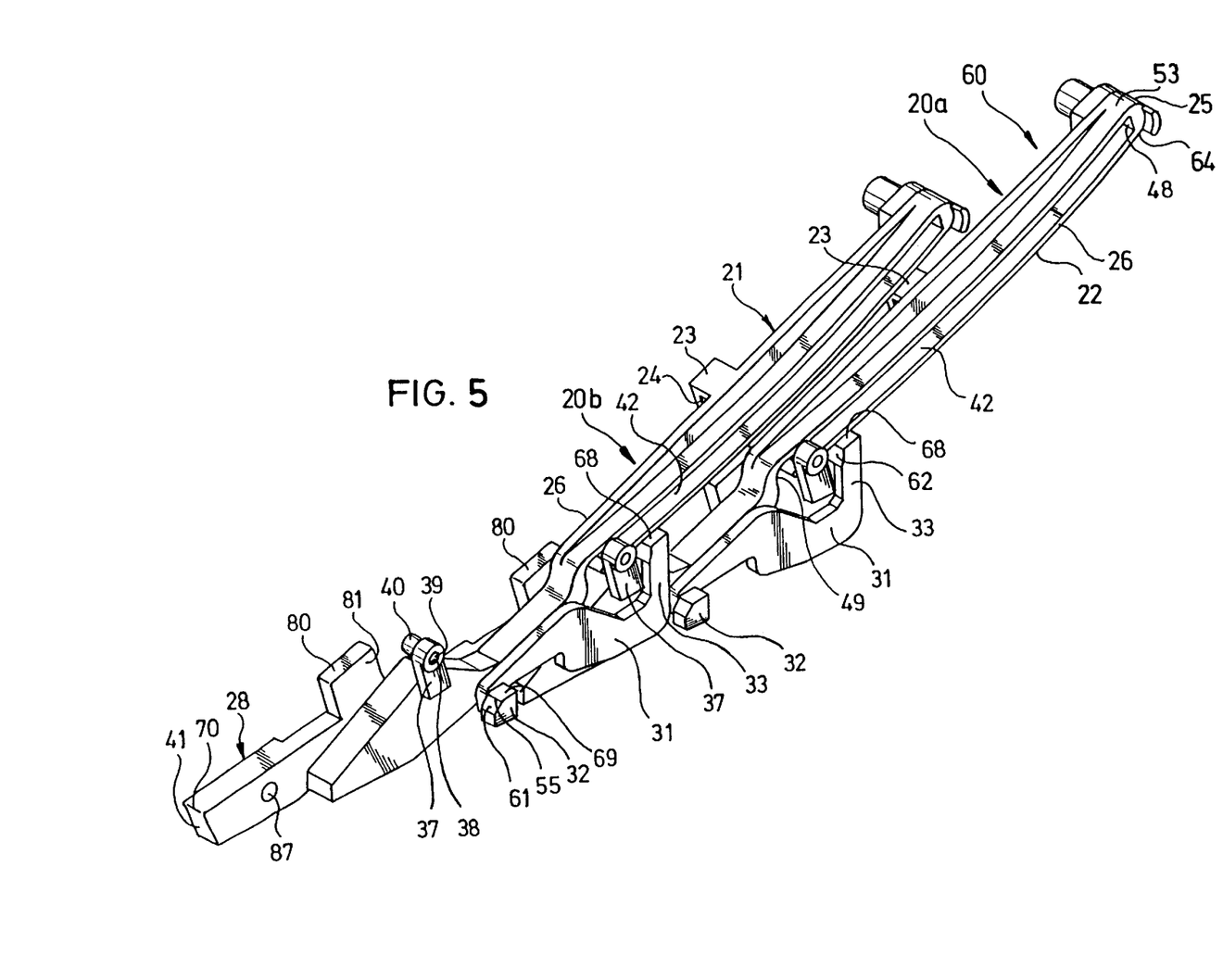
FIG. 5 shows a perspective view of the adjustment elements of two fastening elements which have been swung out.

Another alternative consists in that an adjustment force is applied to the louver system from the front and from the back so that, as shown in FIG. 4, in the opened state, a bundle of raised louvers 10a to 10d which has been pushed together is in the middle part of the longitudinal dimension of the roof opening 13, and as a bundle with variable size, can also be moved anywhere on the roof opening.

In the case of the illustrated embodiment, in the area of the front end of the roof opening 13, there sits a raisable, louver-shaped wind deflector 16 which, when the opening process is initiated, is pivot around an axis which runs transversely to the longitudinal axis of the motor vehicle into a position which rises obliquely toward the rear. In doing so, the roof assumes a ventilation position which can be used also in rain with the louvers in the closed position. The rear edge of the wind deflector 16, in the closed position of the roof 9, fits against the front edge of the forward-most sliding louver 10d to form a seal, and thus, the wind deflector 16 closes the frontmost part of the roof opening 13. Optionally, the layout can also be such that, in the closed position of louvers 10a to 10d, the flat panel system extends from the front edge to the back edge of the roof opening 13, and thus, it alone assumes the closing function. In doing so, for sliding roofs, there can be a wind deflector which, in a conventional manner, disappears under the fixed roof surface with the roof closed, and which automatically raises into a working position when the roof is opened. FIGS. 1 and 2 show a motor vehicle roof with four sliding louvers 10a to 10d; however, it goes without saying that the number of sliding louvers is essentially discretionary depending on the given circumstances. The entire roof opening 13 can be covered, for example, by only two louvers or cover elements.

Each of the louvers 10a to 10d is connected at its narrow side edges to a respective fastening element 20a to 20d. The fastening elements 20a to 20d are preferably made in the manner known from U.S. Pat. No. 5,897,160 which is hereby incorporated by reference and description of the details thereof omitted. Each of the fastening elements 20a to 20d is composed of an outer adjustment element 60 and an inner carrier element which bears a louver 10 (not shown). The adjustment elements 60 each have a rear part 21 and a front part 28.

On the back end 53 of the rear part 21, a curved contact surface 25 is provided which points toward the rear and by an edge 64 which extends toward the bottom 22 of the rear part 21. The bottom 22 of the rear part 21 is formed by a surface which is slightly curved in the displacement direction 14. In the back area at the outer side of the rear part 21 of the adjustment element 60 is a curved crank slot 42 with a curvature which runs roughly parallel to the curvature of the bottom 22, and has has a front end 49 and a back end 48.

The rear part 21 has an inner side 26 of the adjustment element 60 has a laterally extending driver 23 in approximately the middle thereof. Driver 23 is formed with a contact surface which faces rearward and which is bordered by a lower edge and is slightly curved toward the front. The driver 23 also has a recess 24 which is open from below.

Each of the attachment elements 20a, 20b, etc. is movably guided in the conventional manner in a roof-mounted guideway which is formed in the guide rail 75.

Farther forward, on the laterally outer side of the adjustment element 60, an arm 37 which extends upward and is provided with a hole 38. A pin 39 fits into this hole 38 and carries a guide shoe 40. The shoe 40 is connected to the arm 37 on its inner side with a capacity to pivot around an axis which is oriented transversely relative to the displacement direction 14. The shoe 40 engages the crank slot 42 of the preceding fastening element 20b, 20c, etc. such that it can be displaced along the crank slot 42.

The front end of the front part 28 is formed by a front face 41 with a top edge 70. On the outer edge of the back section of the front part 28, a hold-down 80 is formed which extends upward and has a contact surface 81 which faces toward the outside. The rear part 21 of the preceding adjustment element 60 which is connected to the following fastening element by engagement of the shoe 40 in the crank slot 42 is guided laterally at its inner side by the inner surface 26 of the rear part 21 of the adjustment element 60 making contact with the contact surface 81 of the hold-down 80 and laterally to the outside by contact with the shoe 40 or the arm 37, so that no jamming can occur.

The front part 28 is offset parallel to the inside relative to the rear part 21 of the adjustment element 60. The inside surface of the driver 23 which faces to the inside is roughly flush with the inner surface of the front part 28. The recess 24 on the driver 23 is dimensioned such that the hold-down 80 of the following adjustment element 60 can move through this recess in the opening direction without the danger of jamming.

Figure 6:
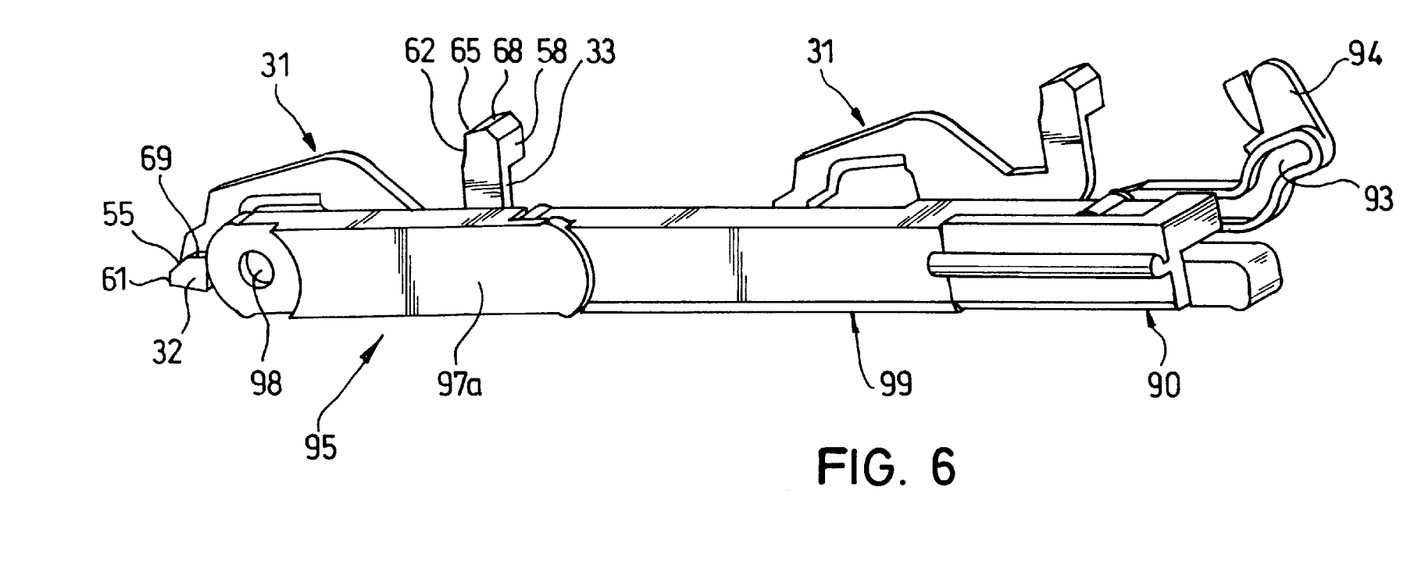
FIGS. 6 and 7 show perspective views opposite sides of a part of the coupling element with a coupling control part and two bolt rockers.
Figure 7:
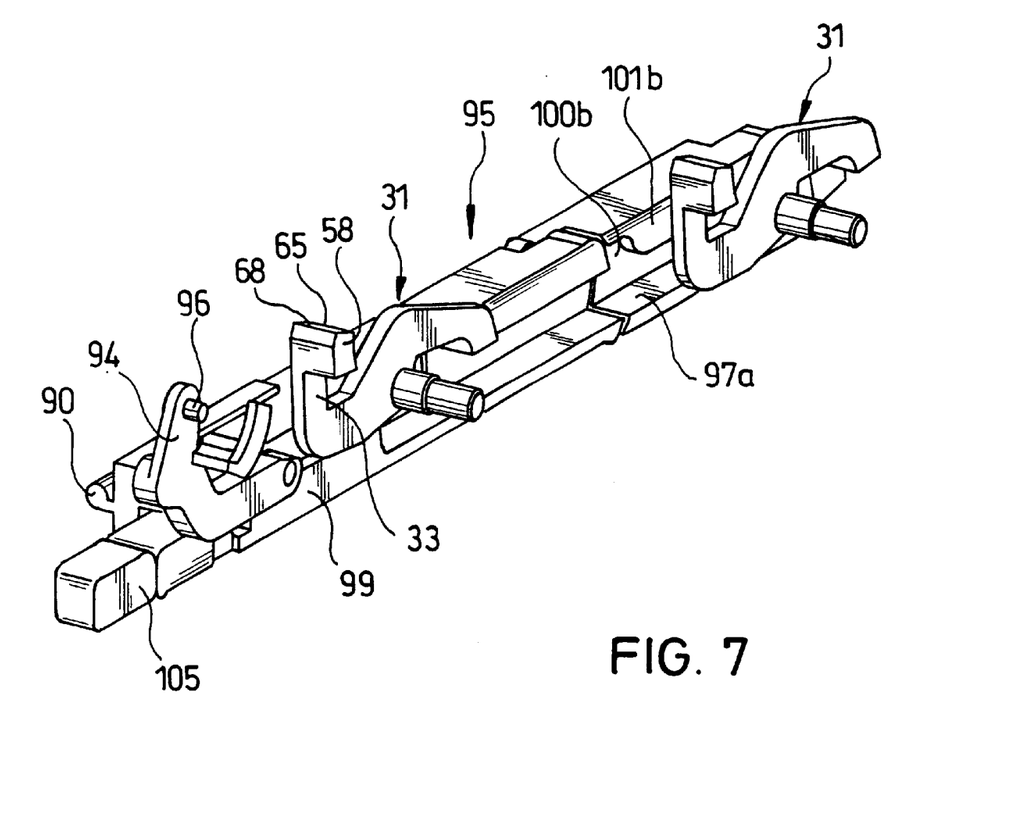

On the outer side of the front section of the rear part 21, a locking element which is made as a bolt rocker 31 is pivotally mounted. The back section of the bolt rocker 31 is made as an actuating arm 33 which points upward and which has a curved contact surface 62 which points forward and up and which fits together with the contact surface 25 of the rear part 21 of the preceding adjustment element 60. The contact surface 62 is separated from a top contact surface 68 by an edge 65 (FIG. 6). In its top section, the actuation arm 33 has a projection 58 which points inward. A pivot bearing element (not shown), for example, a riveted eye, fits through a hole (not shown) in the rear part 21 and a hole (not shown) in the middle area of the bolt rocker 31 with the formation of a pivot axis which is oriented transversely to the displacement direction 14 and around which the bolt rocker 31 can pivot with respect to the adjustment element 60. In the front section of the bolt rocker 31, a bolt part 32 is provided which is offset toward the outside. The bolt part 32 has an inclined contact surface 61 which faces upward and forward and an upper inclined contact surface 69 which borders it in the area of of an edge 55. The bolt rocker 31 is pre-tensioned by a spring (not shown) on the pivot bearing element such that the actuating arm 33 is pressed upward.

Figure 8:
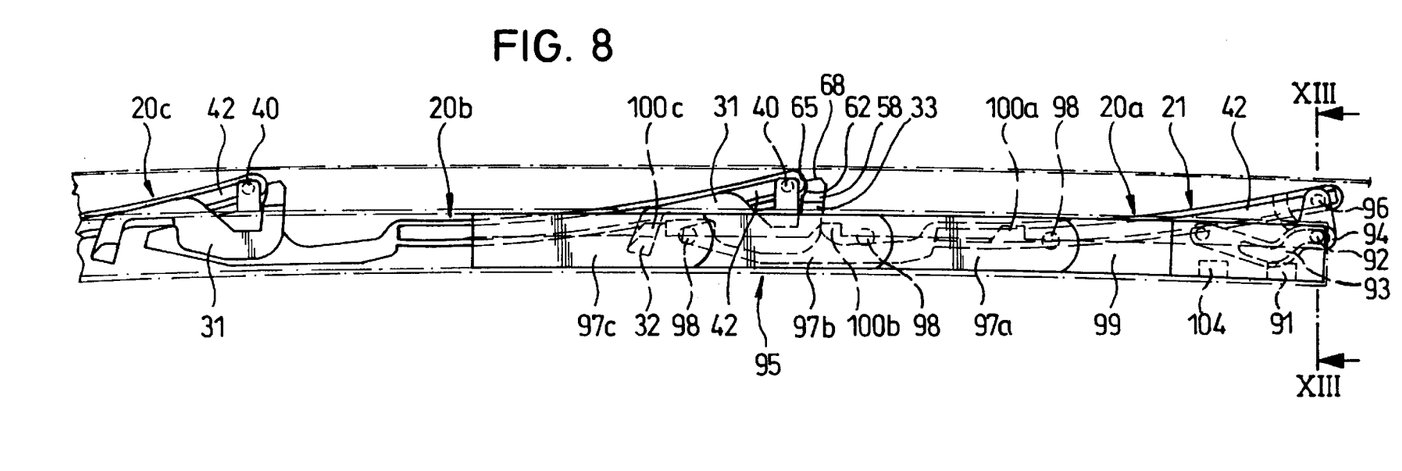
FIG. 8 is a side elevational view of one part of the fastening elements and of the coupling element with the coupling control part in the closed position.
Figure 9:
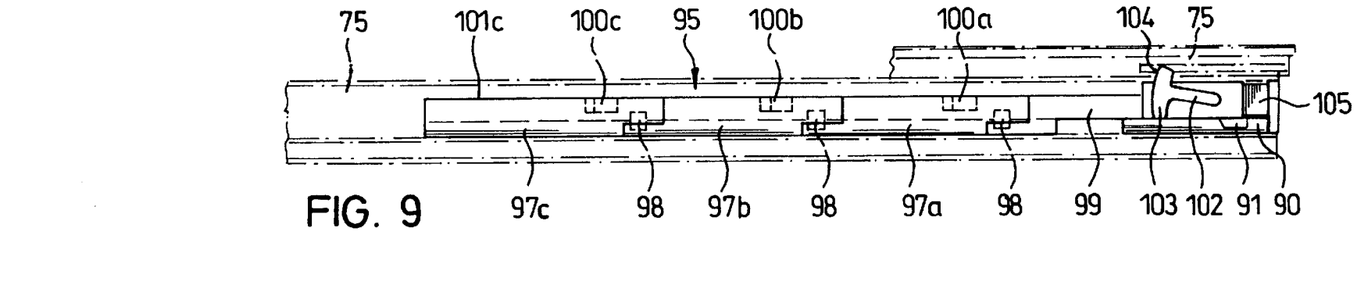
FIG. 9 is a bottom plan view of the arrangement shown in FIG. 8.
Figure 10:
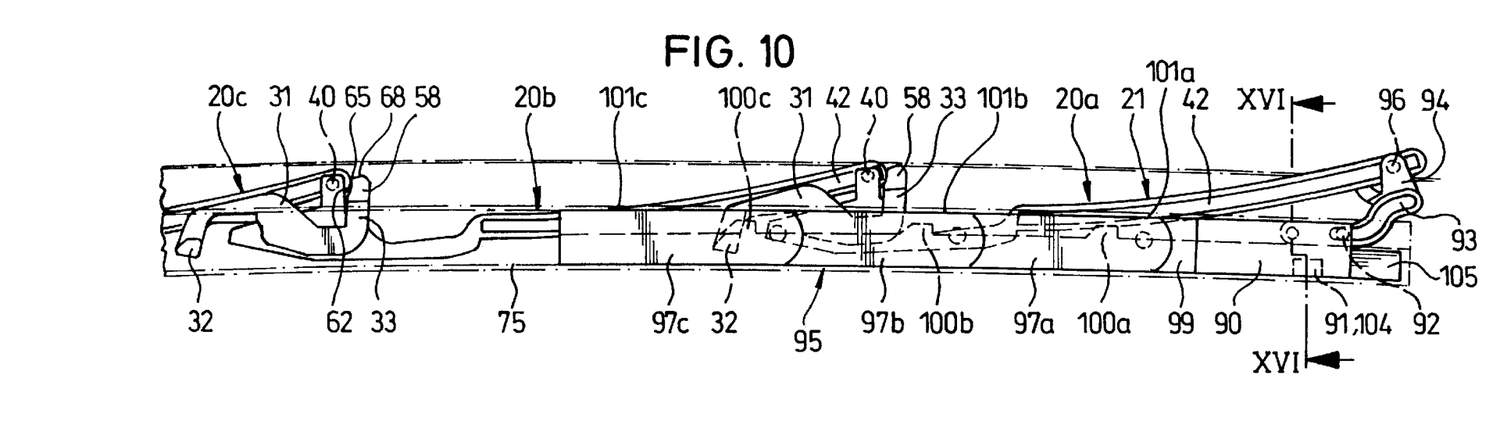
FIG. 10 is a view like FIG. 8, but with the last louver raised above the rear edge of the roof opening.
Figure 11:
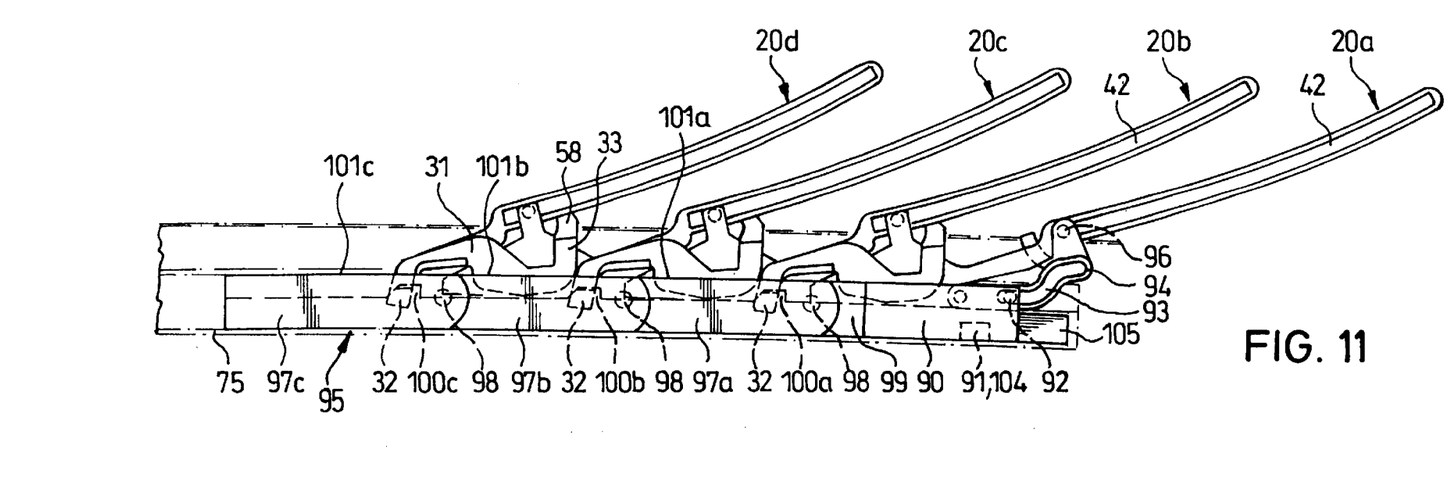
FIG. 11 is a view like FIG. 8, but in the position of FIG. 2.

A coupling control part 90 (FIGS. 6, 7 & 9–16), which is driven by a back drive unit 87 (FIGS. 3 & 4) by means of a rigid drive cable, is guided in the area of the rearmost fastening element 20a to move along a guideway 74 of the guide rail 75 (FIGS. 13–16). The coupling control part 90 has a bolt recess 91 and a crank pin 92 which fits into a S-shaped crank slot 93 of a raising lever 94 (FIG. 8) which is coupled on one end to pivot on the rearmost member 99 of a coupling element 95 and on its other end bears a crank pin 96 which fits into the crank slot 42 of the rearmost fastening element 20a. The coupling element 95 is divided into several members 97a to 97c which are each pivotally connected to one another via a joint 98. Each member 97a to 97c has a cheek 101a to 101c in which a bolt recess 100a to 100c is formed. The rearmost member 99 has a bolt hammer 102 which can be pivoted to the side and which has a head 103 which can fit into a bolt recess 104 of the guide rail 75 or into the bolt recess 91. The coupling element 95 is, as is shown for the member 97c in FIG. 14, movably guided along the guide rail 75.

A drive cable (not shown), which is made preferably as a threaded cable, is drive-coupled to the front part 28 of the adjustment element 60 of the frontmost louver 10d. The drive cable extends to a front drive unit 73 which is only generally represent in broken lines in FIG. 1. The front drive unit 73, like the back drive unit 87, in the conventional manner, can have an electric motor and step-down gearing, a rack connected to the output of the step-down gearing engaging the corresponding drive cables.

Figure 12:
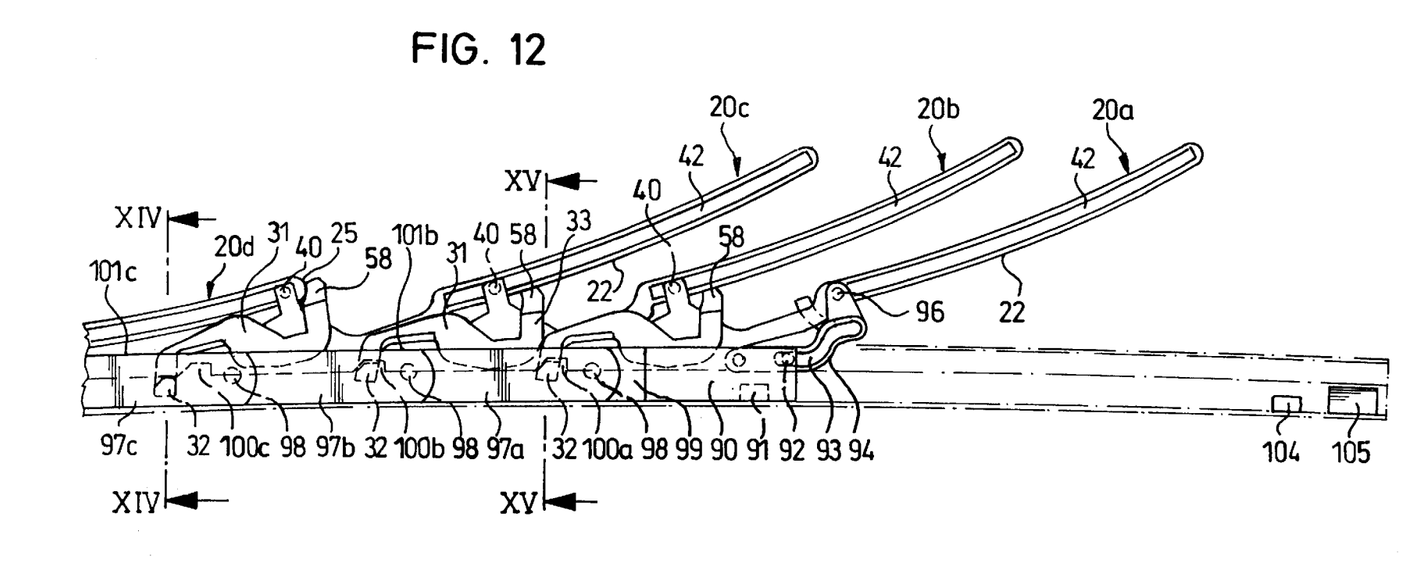
FIG. 12 is a view like FIG. 8, but in the position of FIG. 4.
Figure 13:
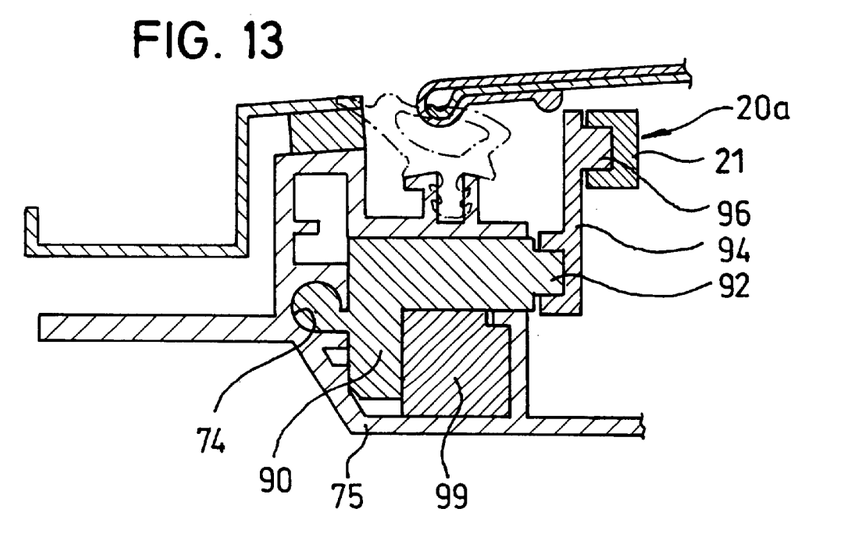
FIG. 13 is a cross-sectional view taken along XIII—XIII in FIG. 8.
Figure 14:
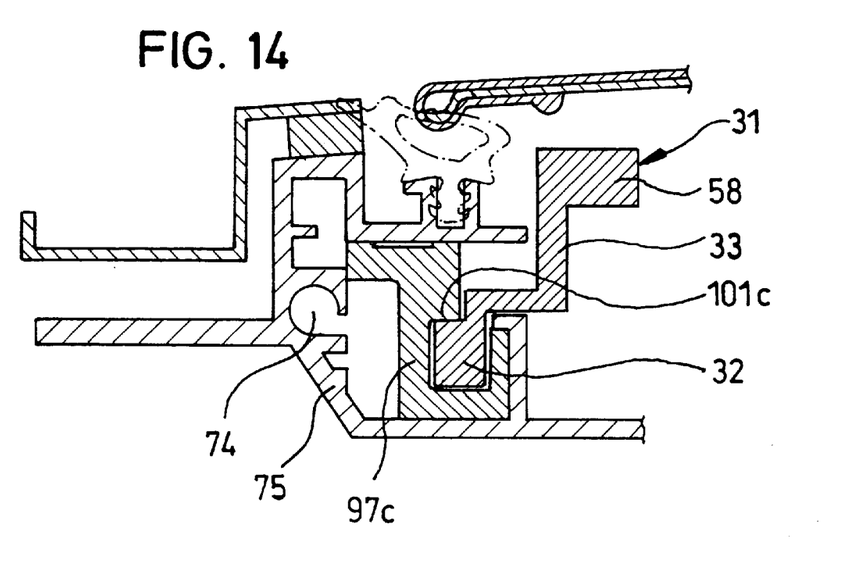
FIG. 14 is a cross-sectional view taken along XIV—XIV in FIG. 12.
Figure 15:
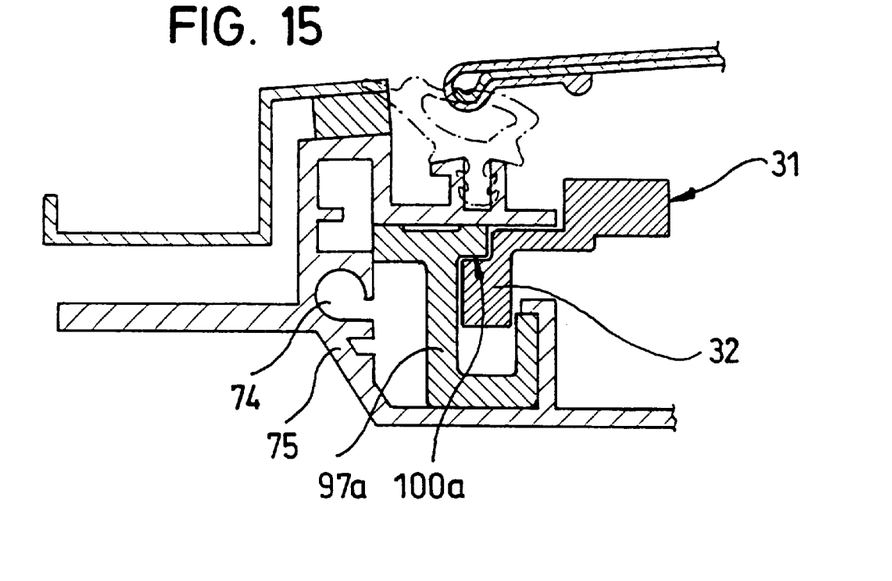
FIG. 15 is a cross-sectional view taken along XV—XV in FIG. 12.
Figure 16:
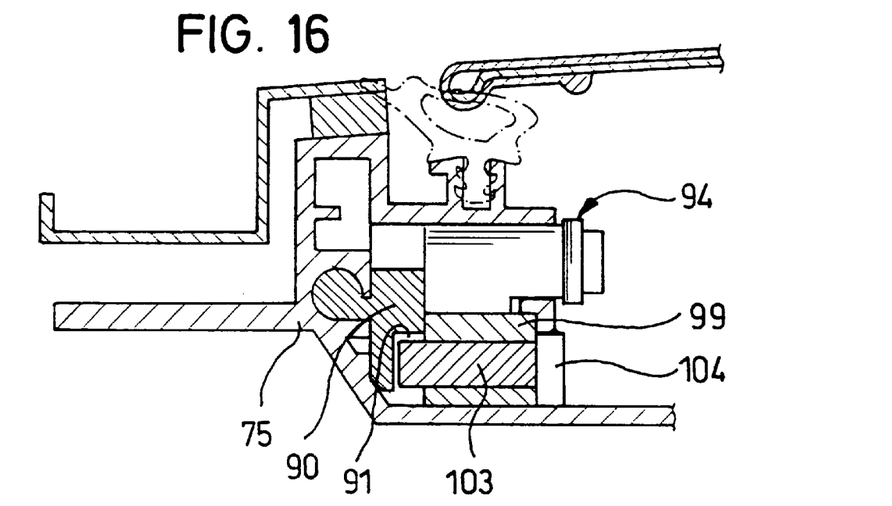
FIG. 16 is a cross-sectional view taken along XVI—XVI in FIG. 10.
Figure 17:
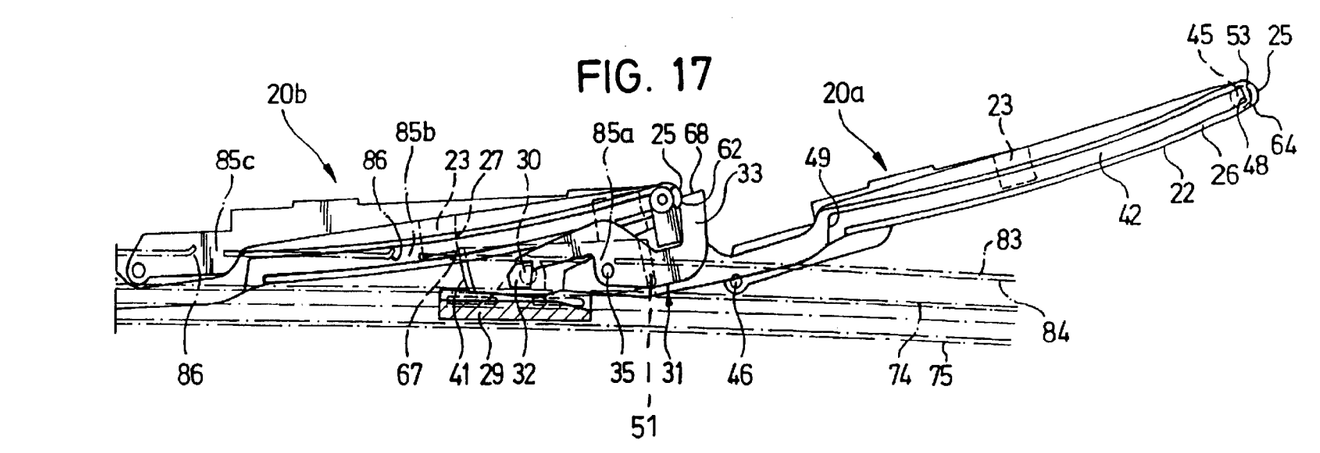
FIGS. 17 & 18 are each a side view of the left side (viewed in the direction of forward travel) of two carrier elements.
Figure 18:
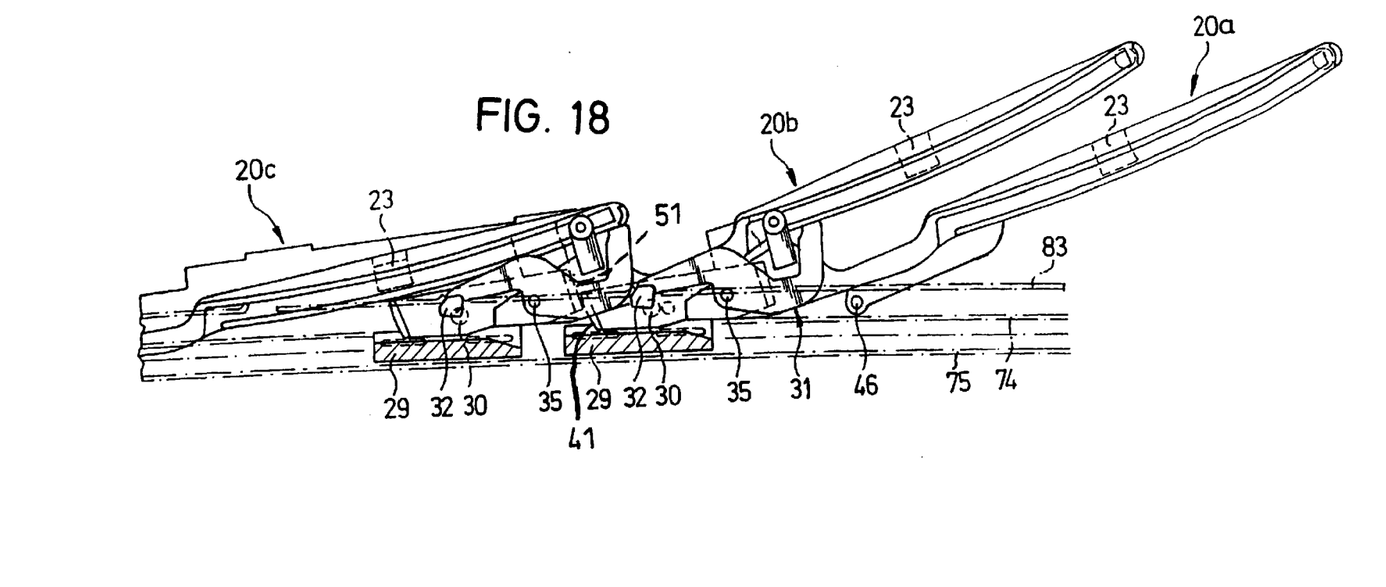

The described louvered roof works as follows:

In the closed position of the roof, adjacent louvers 10a–10d or fastening elements 20a–20d are securely coupled to one another. For rearward displacement, the face 41 of one fastening element (for example 20c) abutting the rearward facing contact surface of the driver 23 of the preceding fastening element (for example, 20d). Coupling for displacement forward takes place by the shoe 40 of one fastening element (for example, 20c) abutting the back end 48 of the crank slot 42 of the preceding fastening element (for example, 20d) and/or by engagement of two other contact surfaces of two adjacent adjustment elements 60. The individual louvers are thus protected against accidental displacement. The bolt rockers 31 are each pretensioned by the springs such that the contact surface 62 of the actuation arm 33 adjoins the contact surface 25 of the preceding adjustment element 60, as shown in FIG. 12, for fastening elements 20c and 20d.

The carrier elements, and thus the louvers 10, all lie parallel to the roof plane. The adjacent fastening elements 20a, 20b, etc. are, as described above, reliably guided on alternating sides in the displacement direction by the rear part 21 making contact with the shoe 40 or the arm 37 and the hold-down 80.

The side of the head 103 of the bolt hammer 102 fits into the roof-mounted bolt recess 104 to lock the rearmost member 99, and thus the entire coupling element 95, securely on the roof, the bolt hammer 102 thus being held in the bolt recess 104 by the other side of the head 103 contacting a wall of the coupling control part 90. The rearmost member 99 is additionally secured by a stop 105 on the guide rail 75 to the back.

The crank pin 96 of the raising lever 94 lies on the back end 48 of the crank slot 42 of the rearmost fastening element. The crank pin 92 of the coupling control part 90 lies in the area of the back end of the crank slot 93 of the raising lever 94.

To open the roof from the front to the back, force is transferred from the front drive unit 73 to the drive cables 59 on either side of the roof opening 13 in the direction which toward the rear. First of all, the drive motion of the drive cable causes the wind deflector 16 to swing out in the manner known from, for example, from German Patent 43 29 580.

Subsequently, or at the same time, the back drive device 87 is activated to push the coupling control part 90 to the front with respect to the rearmost member of the coupling element 95. In doing so, the crank pin 92 of the coupling control part 90 slides toward the front in the crank slot 93 of the raising lever 94, as a result of the shape of the crank slot 93 of the raising lever 94, the rear end is swung upward, In this way, the crank pin 96 is also raised; as a result of its engagement in the crank slot 42 of the rearmost fastening element 20a, this in turn causes the rearmost louver 10a to be raised, by which it is lifted at its back edge above the seal (not shown) on the back edge of the roof opening 13 (see FIGS. 6 and 10). This raising process ends when the coupling control part 90 has been pushed so far to the front that the crank pin 92 has reached the front end of the raising lever 94. In this position, the back drive 87 is turned off by program control, the last member 99 of the coupling element 95 remaining locked on the roof. The coupling control part 90 is held in place by self-locking of the back drive 87, by which the raising lever 94 is fixed in the swung-out position. The crank slot 93 is laid out horizontally in the front area to equalize the hysteresis of the drive 87.

The motor vehicle roof can also be made such that the above described swung-out position of the last louver 10a can also be reached independently of whether the wind deflector 16 is swung out beforehand or not, so that an additional ventilation position is formed.

Subsequently, force is applied by the front drive 73, i.e, by the front drive cables, on the frontmost fastening element 20d. The force is transferred by form-fit from the driver 23 to the face 41 of the respective fastening element 20b, 20c, etc. which follows at the time, by which all louvers 10a to 10d move rearward together.

The crank pin 96 of the raising lever 94 is guided to slide in the crank slot 42 of the last fastening element 20a. Continued displacement of the fastening element 20a to the rear relative to the crank pin 96 of the raising lever 94, in addition to displacement, causes a further raising motion of the last louver 10a.

The guide points of the fastening elements are selected such that raising the rear end of the adjustment element 60 causes lowering of the face 41 relative to the driver 23 of the preceding fastening element 20b. The shoe 40, and thus also the back end of the preceding fastening element 20b, are likewise slightly raised. A corresponding choice of the rotary lever or positions of the fulcrums (guide pins or bearing axles) ensures that the rear edge of the next-to-last louver 10b is raised above the front edge of the last louver 10a by the following (last) louver 10a swinging out, so that the successive louvers can be pushed on top of one another. The fastening elements 20a to 20d are therefore coupled in such a way that the swinging-out motion of the last fastening element 20a causes a swinging-out motion of the preceding fastening elements 20b to 20d which lessens dramatically and which propagates forward. The prestress via the springs causes the actuating arm 33 to track any relative motion between the adjustment elements 60 so that it always adjoins the contact surface 25 of the rear part 21.

The fastening elements 20a, 20b, etc. are pushed to the rear with reference to the coupling element 95. The prestress by the springs reliably prevents the bolt part 32, during opening motion, from catching in a bolt recess 100 of the coupling element as it passes it, for example, due to vibration.

The bolt part 32 is arranged such that the relative height of the bolt part 32 essentially remains unchanged with respect to the cheek 101 of the coupling element 95 during the increasing raising motion of the adjustment element 60 in the course of the opening motion. However, rotary motion of the bolt part 32 takes place. The top contact surface 69 of the bolt part 32 increasingly adjoins the bottom contact surface of the cheek 101 of the coupling element 95. Due to a corresponding sloped configuration of the top contact surface 69 ofthe bolt part 32, this contact causes a certain rotation of the bolt rocker 31 clockwise, i.e. the actuating arm 33, and thus the contact surface 62, move up.

The curvature of the contact surface of the driver 23 or the face 41 of the front part 28 is chosen such that, beginning with a certain swinging-out motion of the adjustment element 60, the bolt rocker 31 transfers the drive force from the preceding adjustment element 60 to the following adjustment element 60 by contact of the top contact surface 69 with the bottom of the cheek 101. This is advantageous in that overlapping of the contact surface 27 of the driver 23 with the face 41 becomes less and less as swinging out increases, so that the pressure becomes greater and greater; this could lead to damage of the corresponding contact surfaces 27 and 41 and especially of the edges 67 and 70 which border these surfaces. The corresponding elements are dimensioned such that force application passes at the proper time to the bolt rocker 31 such that this damage is prevented in any case. In this way, the force-fit between the last two fastening elements 20*a,b* is already taken up by the corresponding bolt rocker 31 when the top edge of the face 41 of the last fastening element 20*a* has not yet dropped entirely under the bottom edge 67 of the contact surface 27 of the driver 23 of the next-to-last fastening element 20*b*.

As soon as the edge 55 between the contact surfaces 61 and 69 of the bolt part 32 has reached the bolt recess 100*a* of the rearmost member 99 of the coupling element 95, the bolt part 32 can move up into the bolt recess 100*a*; this in turn allows the contact surface 62 or the edge 65 of the bolt part to slide down on the sloped contact surface 25 of the adjustment element 60. In this way, the force-fit between the last two fastening elements 20*a* and 20*b* is canceled. These fastening elements are now decoupled. The next-to-last fastening element 20*b* can now move relative to the last one.

The bolt part 32 is kept engaged with the last bolt recess 101*a* of the coupling element 95 by the contact of the top contact surface 68 of the actuating arm 33 with the bottom 22 of the rear part 21 of the adjustment element 60, and in this way, causes rooftop locking of the last fastening element 20*a*. The last louver 10*a* is thus secured against motion forward and backward.

The further opening process takes place analogously to what has already been described, now instead of the last fastening element 20*a* the next to last fastening element 20*b* being swivelled out by displacement relative to the shoe 40 of the last fastening element 20*a*. The function of the crank pin 96 of the raising lever 94 is consequently assumed by the shoe 40 or the front part 28 of the last fastening element 20*a* which is now locked securely on the roof. When the next-to-last fastening element 20*b* has been fully swung out, the rear face 51 of the next-to-last fastening element 20*b* makes contact with the front face 41 of the last fastening element 20*a*.

The decoupling of the force of two fastening elements (for example 20*b,c*) during opening motion causes the preceding fastening element (20*c*) to lock the fastening element (20*b*) which follows at the time on the roof by pressing down the actuation arm (33) into the bolt recess (100*b*).

The opening process can now be analogously continued until the frontmost fastening element 20*d* is fully swung out and the roof opening 13 is thus exposed to the maximum degree. Except for the frontmost louver 10*d*, all louvers are then individually locked in the fully-swung out position with the coupling element 95 which, for its part, is locked on the roof via the bolt hammer 102.

The frontmost louver 10*d* is locked in its position by the front drive 73 being made rigid and self-locking in the conventional manner via the drive cables.

At this point, if a closing motion is initiated, force is transferred in the forward direction from the drive unit 73 to the drive cables which engage the first louver 10*d* on either side of the roof opening 13. The unlocked first louver 10*d* is moved towards the front in this way. The shoe 40 of the second fastening element 20*c* slides in the crank slot 42 of the first fastening element 20*d*. The first fastening element 20*d* is again swung back to some extent by the closing motion to the front. Movement of the second fastening element 20*c* in the closing direction cannot take place since its bolt part 32 is kept engaged to the bolt recess 100*c* via the contact of the actuating arm 33 of the bolt rocker with the bottom 22 of the first fastening element 20*d*.

As soon as the edge 65 of the actuating arm 33 has reached the back end of the bottom 22 of the rear part 21 of the fastening element 20*d*, the actuating arm 33 can move upward so that it becomes possible for the contact surface 61 of the bolt part 32 to slide down on a facing contact surface of the bolt recess 100*c*. Force is applied to the fastening element 20*c* in doing so, as described above, by the shoe 40 of the fastening element 20*c* adjoining the back end 48 of the crank slot 42 of the preceding fastening element 20*d* or by two other contact surfaces adjoining two adjacent adjustment elements 60 at a time. The bolt part 32 thus moves out of the bolt recess, by which the rooftop locking of the fastening element 20*c* is canceled. The adjacent fastening elements 20*d* and 20*c* now are coupled to one another for the closing motion. Furthermore, the second fastening element 20*c* is moved froward by the first 20*d* at the same time. First of all, the two fastening elements 20*c* and 20*d* are coupled in the opening direction via the bolt rocker 31 of the second fastening element 20*c*, later via the contact surface 27 of the driver 23 of the first fastening element 20*d* and the face 41 of the second fastening element 20*c*. This coupling in the opening direction would take effect again when the drive direction is reversed.

The further closing process takes place for the other fastening elements or the louvers in an analogous manner, finally, by the closing motion of the next-to-last fastening element 20*b*, the rooftop locking of the last fastening element 20*a* in the bolt recess 100*a* is released. When the crank pin 96 of the raising lever 94, i.e., the pin which fits into the last fastening element 20*a*, reaches the back end 48 of the crank slot 42, the coupling control part is pushed rearward again by means of the back drive 87, by which the raising lever 94 is lowered again and all louvers are again in a plane parallel to the roof plane. The closing process therefore take place in such away that some of the louvers are always coupled to one another and move jointly in the closing direction, while the remainder of the louvers are locked with the common coupling element 95, i.e., on the roof, and cannot participate in the closing motion. The last movable and the first locked louver are each decoupled from one another. To keep mechanical play low, the coupling of the first locked louver to the last movable louver takes place very shortly after unlocking of the first locked louver, i.e. almost simultaneously thereto.

Opening motion from back to front is described below. In this mode of operation, the rearmost louver 10*a* is raised above the sealing edge by swinging the raising lever 94 out. However, the back drive 87 is not turned off in this position, but continues to run, by which the coupling control part 90 is pushed further to the front. In doing so, the bolt recess 91 passes the hammer head 103, by which the latter swings by form fit into the bolt recess 91, in turn, this causes the other side of the hammer head 103 to decouple from the roof-mounted locking recess 104. In this way, the rooftop locking of the coupling element 95 is released and the coupling element 95 is locked instead to the coupling control part 90 so that, as it continues to run, the coupling element 95, together with the coupling control part 90, is pushed to the front with reference to the stationary fastening elements 20*a*, 20*b*, etc. by means of the back drive 87. The further opening process now runs in the exact kinematic reversal of the above described opening process from front to back, in which the fastening elements are driven and the coupling element 95 and the coupling control part are at rest. Therefore, likewise, the rearmost fastening element 20*a* is fully swung out first, decoupled with the next-to-last fastening element 20*b*, and in doing so, locked at the same time to the coupling element 95, etc., so that finally a louver bundle which is pushed together on the front edge of the roof opening 13 is obtained (see FIG. 3).

Alternatively, the louver bundle can also be opened at the same time from the front and from the back, a louver bundle which has been pushed together in the middle of the roof opening 13 being obtained (see FIG. 4). During opening from the front, the wind deflector 16 is first raised.

Regardless of how the louver system has been opened, the louver bundle formed can be pushed as a whole to the front and the back in the roof opening by synchronous activation of the front and back drives so that a maximum of flexibility is ensured.

Instead of forming the coupling element 95 with several members 97, 99 which are jointed to one another, the coupling element 95 can also be made in one piece out of elastic material.

While various embodiments in accordance with the present invention have been shown and described, it is understood that the invention is not limited thereto, and is susceptible to numerous changes and modifications as known to those skilled in the art. Therefore, this invention is not limited to the details shown and described herein, and includes all such changes and modifications as are encompassed by the scope of the appended claims.

What is claimed is:

1. A motor vehicle roof comprising:
    a fixed roof surface having a roof opening formed therein;
    a roof-mounted guideway;
    a plurality of pivotable fastening elements guided along said guideway; and
    a plurality of cover elements, each respective cover element being connected on a narrow edge to a respective pivotable fastening element in a manner enabling selective displacement thereof along said guideway between positions closing and at least partially opening said roof opening, said plurality of cover elements bordering one another in a closed position to form a flat panel system and being swung up in a fully open position;
        wherein a coupling element is provided for coupling adjacent fastening elements to one another for common motion in an opening and a closing direction, said coupling element being decoupled upon a first of said two adjacent fastening elements reaching a position in which the respective one of said plurality of cover elements connected thereto is placed in said fully swung-out position to enable a relative displacement of the second of said two adjacent fastening elements with respect to said first of said two adjacent fastening elements into a position in which the respective cover element connected to said second of the two adjacent fastening elements is placed into said full swung-out position;
        wherein coupling element is adapted to couple said first of said two adjacent fastening elements to said second of said two adjacent fastening elements under an influence of motion of said second of said two adjacent fastening elements in the opening direction and to automatically decouple said first of said two adjacent fastening elements from said second of said two adjacent fastening elements under an influence of motion of the second of said two adjacent fastening elements in the closing direction;
        wherein said coupling element is mounted for movement along said roof-mounted guideway and is fixable relative to said roof-mounted guideway, said coupling element permitting relative movement between the fastening elements secured thereto; and
        wherein a coupling control part is locked to the coupling element and is in driven connection with a drive for displacement along the roof-mounted guideway.

2. Motor vehicle roof as claimed in claim 1, wherein the element has a locking device for locking to one of the roof-mounted guide rail and the coupling control part, said locking device being actuated by displacement of the coupling control part with reference to the coupling element in said closed position, such that it releases the locking to the roof-mounted guide rail and it engages the locking to the coupling control part.

3. Motor vehicle roof as claimed in claim 2, wherein the locking device comprises a pivoting bolt hammer which establishes the corresponding locking by engaging in bolt recesses in one of the roof-mounted guideway and the coupling control part.

4. Motor vehicle roof as claimed in claim 1, comprising an additional drive for driving a frontmost fastening element.

5. Motor vehicle roof as claimed in claim 1, wherein, in said closed position, the coupling element is locked to the roof-mounted guideway, while the coupling control part is displacable with reference to the coupling element; wherein, at the start of the opening motion, the coupling control part is pushed to the front onto the coupling element such that the rearmost fastening element is swung out, the coupling control part unlocking the coupling element to the roof-mounted guideway and causing locking of the coupling element to the coupling control part; and wherein pushing of the coupling control element towards the front causes swinging out and then locking of the rearmost fastening element to the coupling element, and by continuous pushing of the coupling control element to the front, finally, the plurality of cover elements are pushed together to the front to form a bundle.

6. Motor vehicle roof as claimed in claim 5, wherein the coupling control part engages the rearmost fastening element such that displacement of the coupling control part along the roof-mounted guideway causes the rearmost fastening element to swing out or back depending on the direction of movement.

7. Motor vehicle roof as claimed in claim 6, wherein the coupling control part actuates a raising lever which is pivotally attached to the coupling element and which interacts with the rearmost fastening element.

8. Motor vehicle roof as claimed in claim 7, wherein the raising lever is made as a crank lever which, by means of a crank pin, fits into a crank slot in the last fastening element, the raising lever being provided with another crank slot into which another crank pin, which is on the coupling control part, fits.

9. Motor vehicle roof as claimed in claim 1, wherein the coupling element includes a plurality of pivotally interconnected members.

10. Motor vehicle roof as claimed in claim 9, wherein a coupling element member is provided for each fastening element except for a frontmost fastening element.

11. Motor vehicle roof as claimed in claim 1, wherein locking between the fastening elements and the coupling element takes place via a locking element including a bolt rocker which is mounted in its middle section thereof and which includes a bolt part on a first end and an actuating arm on a second end.

12. Motor vehicle roof as claimed in claim 11, wherein the coupling element, for each fastening element except for a frontmost fastening element, has a bolt recess for accommodating the bolt part.

* * * * *